(12) United States Patent
Richardson

(10) Patent No.: US 9,119,353 B1
(45) Date of Patent: Sep. 1, 2015

(54) SUBSURFACE IRRIGATION

(71) Applicant: Kenneth Owen Richardson, Santa Fe Springs, CA (US)

(72) Inventor: Kenneth Owen Richardson, Santa Fe Springs, CA (US)

( * ) Notice: Subject to any disclaimer, the term of this patent is extended or adjusted under 35 U.S.C. 154(b) by 0 days.

(21) Appl. No.: 14/295,863

(22) Filed: Jun. 4, 2014

(51) Int. Cl.
*A01G 25/00* (2006.01)
*A01G 25/02* (2006.01)
*B05B 1/30* (2006.01)
*B05B 11/00* (2006.01)
*A01G 25/16* (2006.01)

(52) U.S. Cl.
CPC .............. *A01G 25/02* (2013.01); *A01G 25/16* (2013.01); *B05B 1/3006* (2013.01); *B05B 11/0062* (2013.01)

(58) Field of Classification Search
CPC .. B05B 11/0062; B05B 1/3006; A01G 25/00; A01G 25/06; A01G 25/16
See application file for complete search history.

(56) References Cited

U.S. PATENT DOCUMENTS

| | | | | |
|---|---|---|---|---|
| 3,053,461 A * | 9/1962 | Inglis | ............................ | 239/411 |
| 3,807,430 A * | 4/1974 | Keller | ........................ | 137/504 |
| 3,814,377 A * | 6/1974 | Todd | ............................ | 251/145 |
| 3,908,694 A * | 9/1975 | Spears | ....................... | 137/513.3 |
| 4,402,631 A * | 9/1983 | Rosenthal | ....................... | 405/48 |
| 4,858,636 A * | 8/1989 | Adkins | ............................ | 137/8 |
| 4,863,101 A * | 9/1989 | Pater et al. | ...................... | 239/99 |
| 5,201,605 A * | 4/1993 | Lang et al. | ...................... | 405/37 |
| 5,465,905 A * | 11/1995 | Elder | ............................. | 239/75 |
| 5,984,202 A * | 11/1999 | Byles | ............................. | 239/205 |
| 2007/0274783 A1* | 11/2007 | Hibbard et al. | ................. | 405/43 |
| 2008/0041978 A1* | 2/2008 | Keren | ............................ | 239/542 |

* cited by examiner

*Primary Examiner* — Benjamin Fiorello
(74) *Attorney, Agent, or Firm* — Kenneth L. Green; Averill & Green

(57) ABSTRACT

A subsurface emitter includes a valve both preventing water from draining from the system and blocking the entry of roots and soil into the emitter body. A nozzle is present at one or both ends of a vertical tube. A piston is held in a normally closed position by a spring in the absence of water pressure, covering at least one port in the nozzle. When sufficient water pressure in provided, the spring is compressed and the nozzle uncovers the port providing a subsurface spray of water. The spray of water is sufficient to clear mineral deposits which otherwise may accumulate and block the port.

17 Claims, 2 Drawing Sheets

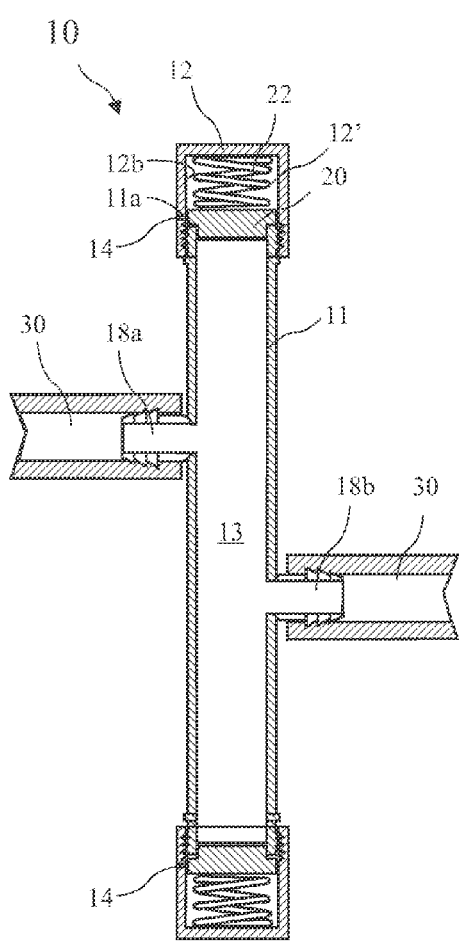
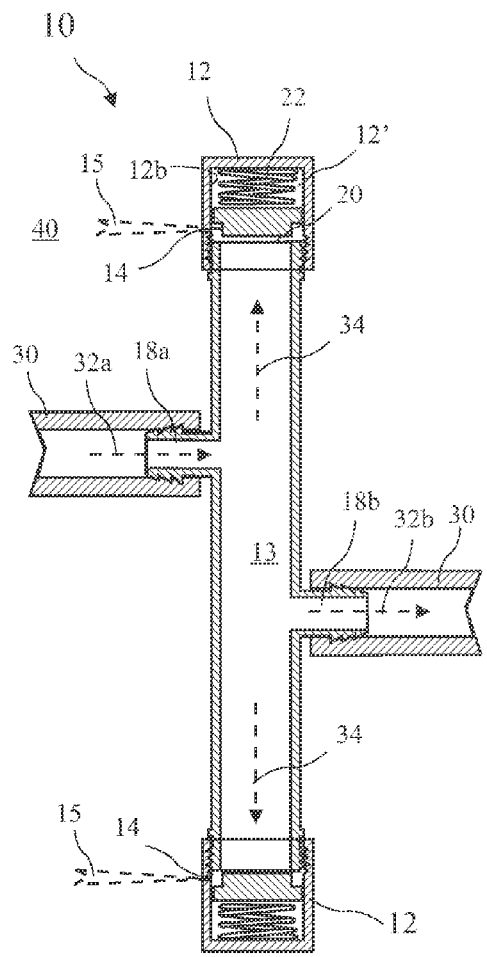
FIG. 3A
FIG. 3B

# SUBSURFACE IRRIGATION

BACKGROUND OF THE INVENTION

The present invention relates subsurface watering and in particular to an improved sub surface emitter.

The advantages of subsurface watering, especially in dry climates, has long been recognized. Conventional watering using sprinklers is often less than 50 percent efficiency due to evaporation. Watering using sprinklers further germinates seeds from weeds resulting in undesirable growth in garden areas. Use of weed killer after the growth of weeds begins often accumulates chemicals in the soil preventing later grow of decorative plants. Releasing water under a ground surface prevents the evaporation of water potentially raising efficiency to close to 100 percent and leave the surface dry to reduce or prevent weeds.

BRIEF SUMMARY OF THE INVENTION

The present invention addresses the above and other needs by providing a subsurface emitter which includes a valve both preventing water from draining from the system and blocking the entry of roots and soil into the emitter body. A nozzle is present at one or both ends of a vertical tube. A piston is held in a normally closed position by a spring in the absence of water pressure, covering at least one port in the nozzle. When sufficient water pressure in provided, the spring is compressed and the nozzle uncovers the port providing a subsurface spray of water. The spray of water is sufficient to clear mineral deposits which otherwise may accumulate and block the port.

In accordance with one aspect of the invention, there is provided a subsurface emitter including a water pressure actuated valve which covers the port in the nozzle. Known subsurface emitters have quickly failed because plant roots follow the water back to the source and into the nozzle. Because the piston blocks the port when the watering system is off, the roots cannot enter and block the port.

In accordance with another aspect of the invention, there is provided a subsurface emitter including a small port producing a high water velocity. The water velocity is sufficient to prevent an accumulation of minerals which otherwise may block the port.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3A is a cross-sectional view of the subsurface emitter according to the present invention in a closed position taken along line 3-3 of FIG. 1B.

FIG. 3B is a cross-sectional view of the subsurface emitter according to the present invention in an open position taken along line 3-3 of FIG. 1B.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1B:
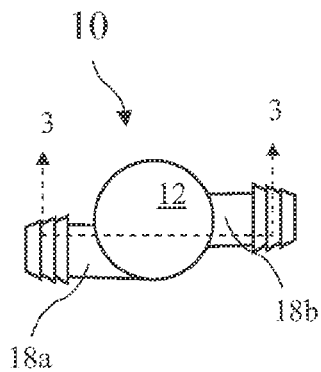
FIG. 1B is a top view of the subsurface emitter according to the present invention.
Figure 1A:
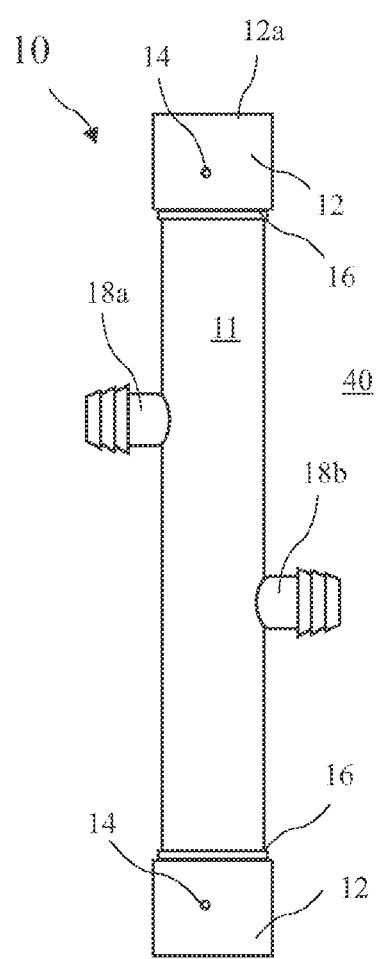
FIG. 1A is a side view of a subsurface emitter according to the present invention.

A side view of a subsurface emitter 10 according to the present invention is shown in FIG. 1 and a top view of the subsurface emitter 10 is shown in FIG. 1B. The emitter 10 includes a body 11, at least one nozzle and preferably two nozzles 12 attached to opposite ends of the body 11, and an inlet 18a and an outlet 18b on opposite sides of the body 11. The nozzles 12 include a closed top 12a and at least one round port 14 for spraying water from the emitter 10. The inlet 18a may be offset to create turbulence inside the body to release dissolved air in the water. The emitter 10 resides in a subsurface area 40.

Figure 2:
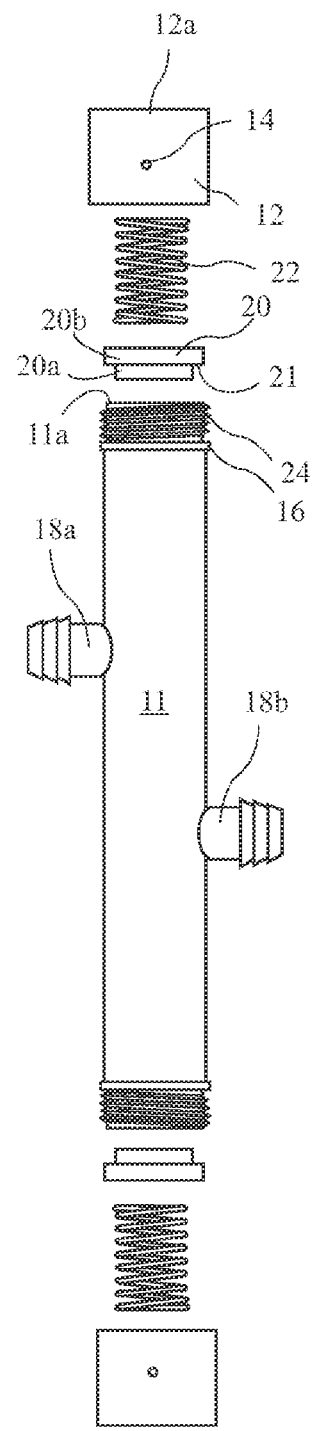
FIG. 2 is an exploded side view of the subsurface emitter according to the present invention.

An exploded side view of the subsurface emitter 10 is shown in FIG. 2. A piston 20 resides in the nozzle 12 and is pressed into an end 11a of the body 11 providing a seat for the piston 20. The piston 20 is preferably stepped and a smaller diameter portion 20a entered the end 11a of the body 11 and a larger diameter circumferential piston wall portion 20b separated from the smaller diameter circumferential piston wall portion 20a by a piston seat 21. A spring 22 resides in the nozzle 12 pushing the piston 20 against and into the end 11a of the body 11. The spring 22 and piston 20 create a valve A cross-sectional view of the subsurface emitter 10 in a closed position taken along line 3-3 of FIG. 1B is shown in FIG. 3A. The piston 20 is shown pushed against the end 11a of the body 11 preventing a backflow of water from the emitter 10 into a watering system 30. In the closed position, the piston 20 further resides over the port 14 in a generally vertical nozzle wall 12b preventing roots from growing into the port 14 and blocking the spray of water 15 (see FIG. 3B) from the port 14.

A cross-sectional view of the subsurface emitter 10 in an open position taken along line 3-3 of FIG. 1B is shown in FIG. 3B. A flow of water 32a under pressure is provided to an interior 13 of the emitter 10 producing flows 34 to the nozzles 12 and 32b leaving the emitter 10. The flows 34 push the pistons 20 vertically along the nozzle wall 12b to an open position exposing the ports 14 to the flows 34 creating a spray 15 from the emitter 10.

While the invention herein disclosed has been described by means of specific embodiments and applications thereof, numerous modifications and variations could be made thereto by those skilled in the art without departing from the scope of the invention set forth in the claims.

I claim:

1. A subsurface emitter comprising:
   a body;
   an inlet into the body, the inlet configured to connect to a watering system to place an emitter interior in fluid communication with the watering system;
   an outlet into the body, the outlet configured to connect to the watering system to further place the emitter interior in fluid communication with the watering system;
   at least one nozzle attached to an end of the body;
   at least one port in the nozzle providing fluid communication between a nozzle interior and a subsurface area adjacent to the nozzle;
   a cylindrical piston residing between the emitter interior and the nozzle interior, a first larger cylindrical surface portion of the piston slides against an interior wall of the nozzle, and a piston seat resides between the first larger cylindrical surface portion and a second surface portion having a smaller diameter than the first larger cylindrical surface portion;
   a spring biasing the piston towards the body;
   a closed piston position wherein the first larger cylindrical surface portion of the piston covers the port and the piston seat resides against a body seat blocking fluid communication between the emitter interior and the nozzle interior and water from the watering system is prevented from escaping the nozzle into the subsurface area adjacent to the nozzle and the piston blocks the fluid communication through the port between the subsurface area and the nozzle interior; and an open piston position wherein fluid communication between the emitter interior and the nozzle interior is open and water from the watering system is allowed to escape the nozzle through the at least one port into the subsurface area adjacent to the nozzle.

2. The emitter of claim 1, wherein the piston is pressed against an end of the body in the closed position.

3. A subsurface emitter comprising:
an emitter body;
an inlet into the emitter body, the inlet configured to connect to a watering system to place an emitter interior inside the emitter body in fluid communication with the watering system;
an outlet into the emitter body, the outlet configured to connect to the watering system to further place the emitter interior in fluid communication with the watering system;
at least one nozzle attached to an end of the emitter body;
at least one port in the nozzle providing fluid communication between a nozzle interior inside the nozzle and a subsurface area adjacent to the nozzle;
a valve residing between the emitter interior and the nozzle interior, the valve comprising a piston residing entirely inside the emitter body and nozzle and a spring pressing the piston against an end of the emitter body, the piston having a top portion in slidable contact with a nozzle interior wall of the nozzle;
a closed valve position wherein:
fluid communication between the emitter interior and the nozzle interior is closed by contact between the piston and the end of the emitter body and water from the watering system is prevented from escaping the nozzle into the subsurface area adjacent to the nozzle and the piston blocks the fluid communication through the port between the subsurface area and the emitter interior; and
the top portion of the piston residing against the interior wall of the nozzle covering the port; and
an open valve position wherein fluid communication between the emitter interior and the nozzle interior is open and water from the watering system is allowed to escape the nozzle thorough the port into the subsurface area adjacent to the nozzle.

4. The emitter of claim 3, wherein at least one nozzle comprises a first nozzle attached to one end of the emitter body a second nozzle attached to a second end of the body opposite to the first end.

5. The emitter of claim 3, wherein the inlet and outlet are on opposite sides of the emitter body.

6. The emitter of claim 5, wherein the inlet and the outlet are staggered.

7. The emitter of claim 3, wherein the spring resides entirely in the nozzle between the piston and a closed end of the nozzle opposite to the emitter body.

8. A subsurface emitter comprising:
emitter body having an emitter interior;
an inlet into the emitter body, the inlet configured to connect to a watering system to place the emitter interior in fluid communication with the watering system;
a nozzle attached to a first end of the emitter body, the nozzle having nozzle interior, a closed end opposite the emitter body, and a nozzle interior wall surrounding the nozzle interior;
at least one port in the nozzle reaching though the nozzle interior wall and providing fluid communication between the nozzle interior and a subsurface area adjacent to the nozzle;
a piston residing between the emitter interior and the nozzle interior and including a circumferential piston wall portion slidable against the nozzle interior wall;
a spring compressed between the closed end of the nozzle and the piston;
a closed position wherein:
the piston is seated against an emitter body seat of the emitter body blocking fluid communication between the emitter interior and the nozzle interior; and
the circumferential piston wall portion resides over the port blocking fluid communication between the nozzle interior and the subsurface area adjacent to the nozzle; and
an open piston position wherein:
the spring is further compressed by water pressure against the piston;
the piston resides closer to the closed end of the nozzle than in the closed position and the emitter interior is in fluid communication with the nozzle interior; and
the circumferential piston wall portion is vertically spaced apart above the port and the nozzle interior is in fluid communication with the subsurface area adjacent to the nozzle.

9. The emitter of claim 8, wherein the piston is cylindrical.

10. The emitter of claim 8, wherein the circumferential piston wall portion is a first portion residing against the port when the piston is in the closed position sealing the port and the piston includes a piston seat below the first portion, the piston seat seating against the emitter body seat.

11. The emitter of claim 10, wherein:
the piston includes a second portion below the piston seat, the second portion having a smaller horizontal cross-section than the first portion;
the emitter body seat resides at a top of the emitter body; and
the second portion of the piston resides inside the emitter body in the closed position.

12. The emitter of claim 8, wherein the piston resides entirely inside the emitter body and nozzle.

13. The emitter of claim 8, further including a second nozzle attached to a second end of the emitter body opposite to the first end.

14. The emitter of claim 8, further including an outlet configured to connect to the watering system to place the emitter interior in further fluid communication with the watering system.

15. The emitter of claim 14, wherein the inlet and outlet are on opposite sides of the emitter body.

16. The emitter of claim 14, wherein the inlet and outlet are vertically staggered.

17. The emitter of claim 8, wherein the port is a round port.

* * * * *